(12) United States Patent
Sumasu et al.

(10) Patent No.: US 8,149,772 B2
(45) Date of Patent: Apr. 3, 2012

(54) CHANNEL QUALITY INFORMATION REPORTING METHOD, BASE STATION APPARATUS, AND COMMUNICATION TERMINAL

(75) Inventors: Atsushi Sumasu, Kanagawa (JP); Masayuki Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 701 days.

(21) Appl. No.: 11/718,509

(22) PCT Filed: Oct. 18, 2005

(86) PCT No.: PCT/JP2005/019083
§ 371 (c)(1),
(2), (4) Date: May 2, 2007

(87) PCT Pub. No.: WO2006/049009
PCT Pub. Date: May 11, 2006

(65) Prior Publication Data
US 2009/0067329 A1 Mar. 12, 2009

(30) Foreign Application Priority Data
Nov. 4, 2004 (JP) .................................. 2004-321253

(51) Int. Cl.
*H04W 4/00* (2009.01)
(52) U.S. Cl. ...................... 370/329; 370/310.2; 370/322; 370/341; 370/348; 370/395.21; 455/450; 455/451; 455/452.1; 455/452.2; 455/453
(58) Field of Classification Search ............... 370/310.2, 370/329, 322, 341, 348, 395.21–395.43; 455/450–452.2, 453, 464
See application file for complete search history.

(56) References Cited

U.S. PATENT DOCUMENTS

| | | | | |
|---|---|---|---|---|
| 5,463,620 A * | 10/1995 | Sriram | | 370/412 |
| 5,924,042 A | 7/1999 | Sakamoto | | |
| 6,167,031 A * | 12/2000 | Olofsson et al. | | 370/252 |
| 6,628,668 B1 * | 9/2003 | Hutzli et al. | | 370/468 |
| 6,693,892 B1 | 2/2004 | Rinne et al. | | |
| 6,993,294 B2 | 1/2006 | Nobukiyo et al. | | |
| 7,660,282 B2 * | 2/2010 | Sarkar | | 370/331 |
| 2004/0022213 A1 | 2/2004 | Choi | | |

FOREIGN PATENT DOCUMENTS
EP 1 437 854 7/2004
(Continued)

OTHER PUBLICATIONS
International Search Report dated Jan. 31, 2006.
(Continued)

*Primary Examiner* — Steve D Agosta
(74) *Attorney, Agent, or Firm* — Dickinson Wright PLLC

(57) ABSTRACT

There is provided a base station device for suppressing increase of current consumption at a communication terminal by a line quality information report used for resource allocation of a downstream line and increase of interference of the upstream line traffic. The base station device reports whether a terminal performing communication which may be delayed, to each communication terminal (ST301). When the communication terminal has received a report that it is a terminal performing communication whose delay is not permitted, it reports the line quality information all the report timings (ST302, ST307, ST310). On the other hand, when the terminal is decided to be a terminal performing communication which may be delayed, it reports line quality information on an preferable average line quality sub-carrier group once a predetermined report timing (ST303).

16 Claims, 7 Drawing Sheets

FOREIGN PATENT DOCUMENTS

| | | |
|---|---|---|
| JP | 8-336180 | 12/1996 |
| JP | 2001512939 | 8/2001 |
| JP | 2003199173 | 7/2003 |
| JP | 2004-040314 | 2/2004 |
| JP | 2004-056210 | 2/2004 |
| JP | 2004-128661 | 4/2004 |
| WO | 2004/004173 | 1/2004 |
| WO | 2004/075596 | 9/2004 |
| WO | WO 2004/077871 | 9/2004 |

OTHER PUBLICATIONS

Y. Hara, et al., "MC-CDM System for Packet Communications Using Frequency Scheduling," Technical Report of IEICE, The Institute of Electronics, Information and Communication Engineers, NS2002-101 RCS2002-129, pp. 61-66, Jul. 2002.
Japanese Office Action dated Apr. 13, 2010.
European Search Report dated Aug. 4, 2011.
Japanese Office Action dated Jan. 11, 2011.

* cited by examiner

CHANNEL QUALITY INFORMATION REPORTING METHOD, BASE STATION APPARATUS, AND COMMUNICATION TERMINAL

TECHNICAL FIELD

The present invention relates to a method for reporting channel quality information which is used as a reference when a base station determines resource assignment, a communication terminal that reports the channel quality information, and a base station apparatus that assigns resource based on the reported channel quality information.

BACKGROUND ART

It is important in high-speed wireless transmission to increase signal transmission efficiency by performing flexible transmission control that can accommodate various types of traffic. Frequency scheduling in MC-CDM (Multi Carrier-Code Division Multiplexing) is investigated in Non-patent Document 1, for example. In the frequency scheduling disclosed therein, a base station selects a subcarrier having a good channel based on reception quality such as the SINR (Signal to Interference and Noise Ratio) reported from a plurality of terminals, and transmits data. Each user uses a subcarrier having a good channel state, and communication at a small PER (Packet Error Rate) is therefore possible.

A method taking into consideration a delay request of a user is proposed in Patent Document 1 as a traffic control technique that takes into consideration a delay request of a user. More specifically, in the case of a connection that has a strict request for a transmission delay, a circuit exchange connection is assigned that accompanies a bandwidth that can be automatically controlled. After resources are assigned to the circuit exchange connection, resources for transmitting a given quantity of data are assigned from an unspecified resource pool by a time-limited based assignment to a connection that has a high allowable delay with respect to each assignment cycle.

Patent Document 1: Japanese Patent Application Publication No. 2001-512939

Non-patent Document 1: "MC-CDM System for Packet Communications Using Frequency Scheduling," Technical Report of the Institute of Electronics, Information and Communication Engineers of Japan, RSC2002-129 (2002-07).

DISCLOSURE OF INVENTION

Problems to be Solved by the Invention

However, in the traffic control method described in Non-patent Document 1, since the terminal must report reception quality information for all subcarriers or all frequency blocks, the amount of uplink control information increases, and there is a risk of increased interference with other traffic. Furthermore, since the reception quality must be measured and transmitted at the terminal side over all subcarriers or frequency blocks, there is a problem that signal processing used for quality measurement and a terminal current required for transmission of the control information increase.

In the above-described traffic control method of Patent Document 1, even though the priority level of assignment in the scheduler is highly likely to decrease for a user having a large allowable delay, it is necessary to continue to transmit control information that is equivalent to that for a user having a small allowable delay. As a result, the amount of interference due to transmission of control information increases, and more current is consumed by reception quality measurement and control information transmission.

It is therefore an object of the present invention to provide a channel quality reporting method, a base station apparatus, and a communication terminal that are capable of suppressing an increase in the current consumption of the communication terminal required to generate channel quality information and transmit control information, and an increase in interference due to transmission of the channel quality information.

Means for Solving the Problem

The channel quality reporting method of the present invention includes at a communication terminal an allowable delay information receiving step of receiving allowable delay information indicating the size of an allowable delay of the communication terminal transmitted from a base station apparatus; and a channel quality reporting step of changing, based on the allowable delay information, a reporting frequency and/or the amount of the channel quality information reported to the base station apparatus.

The communication terminal of the present invention includes a receiving section that receives allowable delay information indicating the size of an allowable delay of the communication terminal; a determining section that determines a reporting frequency and/or the amount of channel quality information which is used as a reference when a base station apparatus assigns a resource based on the allowable delay information; and a channel quality reporting section that reports channel quality information according to the reporting frequency and/or the amount of information determined by the determining section.

The base station apparatus of the present invention includes: a receiving section that receives channel quality information which is transmitted from a communication terminal and used as a reference for determining resource assignment; a resource assigning section that performs resource assignment based on the channel quality information; a transmitting section that transmits data to each communication terminal based on the resource assignment determined by the resource assigning section; a determining section that determines the size of an allowable delay for each communication terminal; and an instructing section that issues an instruction to change a reporting frequency and/or the amount of the channel quality information reported by the communication terminal based on the size of the allowable delay determined by the determining section.

Advantageous Effect of the Invention

According to the present invention, by changing the reporting frequency or the amount of channel quality information used to assign resources based on the size of the allowable delay of each user, it is possible to suppress an increase in the current consumption of the communication terminal, and an increase in interference due to transmission of channel quality information.

BEST MODE FOR CARRYING OUT THE INVENTION

Embodiments of the present invention will be described in detail hereinafter with reference to the accompanying drawings.

Embodiment 1

In this embodiment, a communication system that uses a multi-carrier scheme including OFDM (Orthogonal Frequency Division Multiplexing) will be described as an example, and a base station apparatus communicates with communication terminal 1 (MS#1) and communication terminal 2 (MS#2). In the description given hereinafter, communication terminal 1 and communication terminal 2 are sometimes referred to as mobile station 1 and mobile station 2, respectively.

Figure 1:
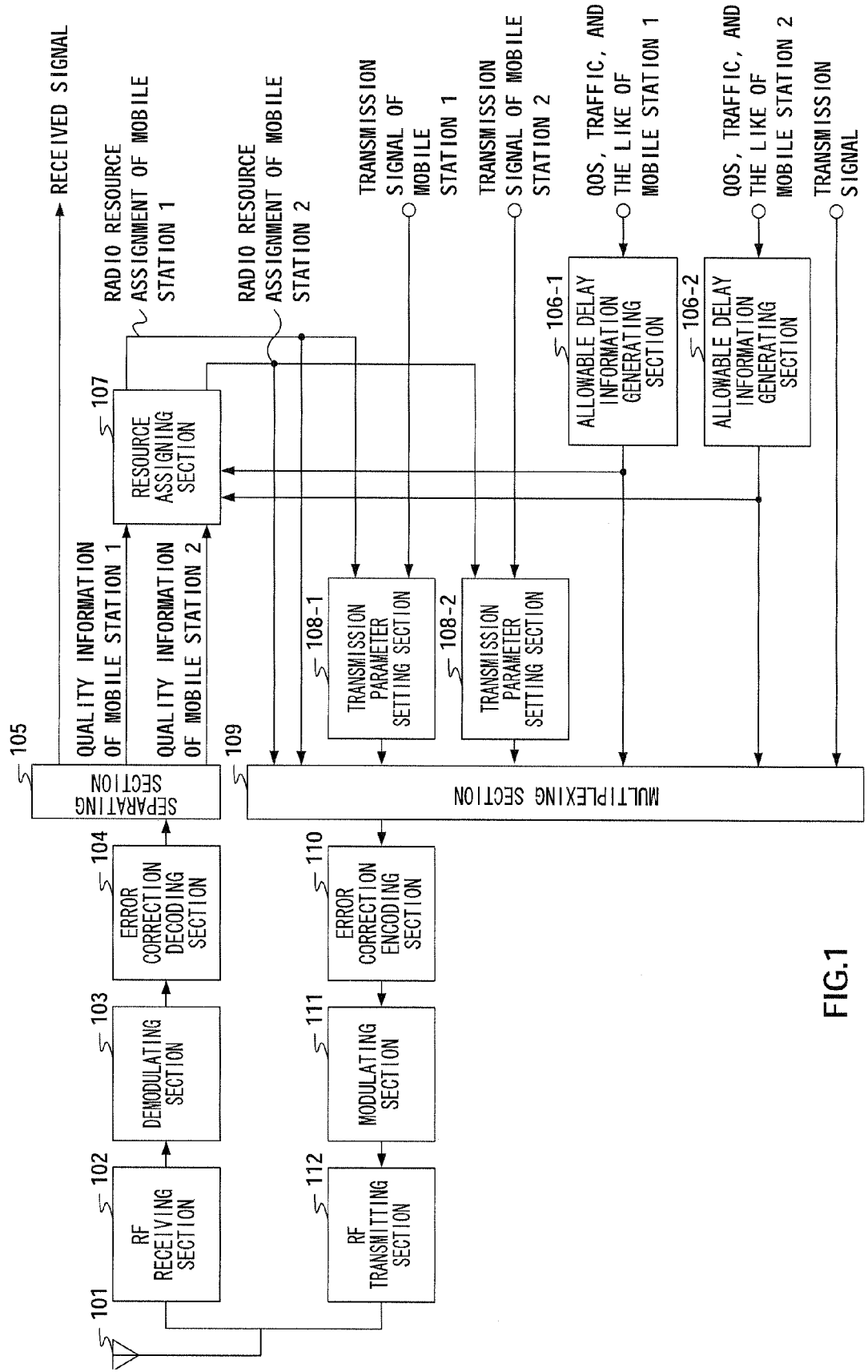
FIG. 1 is a block diagram showing a configuration of a base station apparatus according to Embodiment 1 of the present invention.

FIG. 1 is a block diagram showing a configuration of the base station apparatus according to Embodiment 1 of the present invention. Base station apparatus 100 has antenna 101; RF (Radio Frequency) receiving section 102, demodulating section 103; error correction decoding section 104; separating section 105; allowable delay information generating sections 106-1 and 106-2; resource assigning section 107; transmission parameter setting sections 108-1 and 108-2; multiplexing section 109; error correction encoding section 110, modulating section 111; and RF transmitting section 112.

Antenna 101 receives a signal transmitted from a communication terminal and outputs the signal to RF receiving section 102, and transmits a transmission signal inputted from RF transmitting section 112. RF receiving section 102 performs predetermined radio reception processing such as down-conversion on the signal received via antenna 101, and outputs the result to demodulating section 103.

Demodulating section 103 demodulates the signal inputted from RF receiving section 102 and outputs the result to error correction decoding section 104.

Error correction decoding section 104 performs error correction decoding of the signal inputted from demodulating section 103 and outputs the result to separating section 105.

Separating section 105 separates the demodulated signal inputted from error correction decoding section 104 into a received signal and channel quality information of communication terminal 1 and communication terminal 2. The separated channel quality information of communication terminal 1 and communication terminal 2 is then outputted to resource assigning section 107.

Allowable delay information generating sections 106-1 and 106-2 generate QoS (Quality of Service) information (allowable delay information) that includes a required quality relating to the allowable delay of communication terminal 1 and communication terminal 2 based on the QoS and traffic required for each user, and output the QoS information to resource assigning section 107 and multiplexing section 109.

Resource assigning section 107 determines resource assignment and generates resource assignment information based on the channel quality information of the communication terminal that is separated by separating section 105, and based on the allowable delay information generated by allowable delay information generating sections 106-1 and 106-2. The resource assignment information thus generated is outputted to multiplexing section 109 and transmission parameter setting sections 108-1 and 108-2.

Transmission parameter setting sections 108-1 and 108-2 set a transmission parameter such as a modulation scheme, encoding efficiency based on the resource assignment information inputted from resource assigning section 107 and the signal transmitted to the communication terminal, and output the transmission parameter as transmission parameter information to multiplexing section 109.

Multiplexing section 109 multiplexes the allowable delay information inputted from allowable delay information generating section 106, the resource assignment information inputted from resource assigning section 107, the transmission parameter information inputted from transmission parameter setting section 108, and the transmission signal (transmission data), and outputs the multiplexed signal to error correction encoding section 110.

Error correction encoding section 110 performs error correction encoding of the multiplexed signal inputted from multiplexing section 109 and outputs the result to modulating section 111.

Modulating section 111 modulates the signal inputted from error correction encoding section 110 and outputs the modulated signal to RF transmitting section 112. RF transmitting section 112 performs predetermined radio reception processing such as up-conversion and outputs the result to antenna 101.

Figure 2:
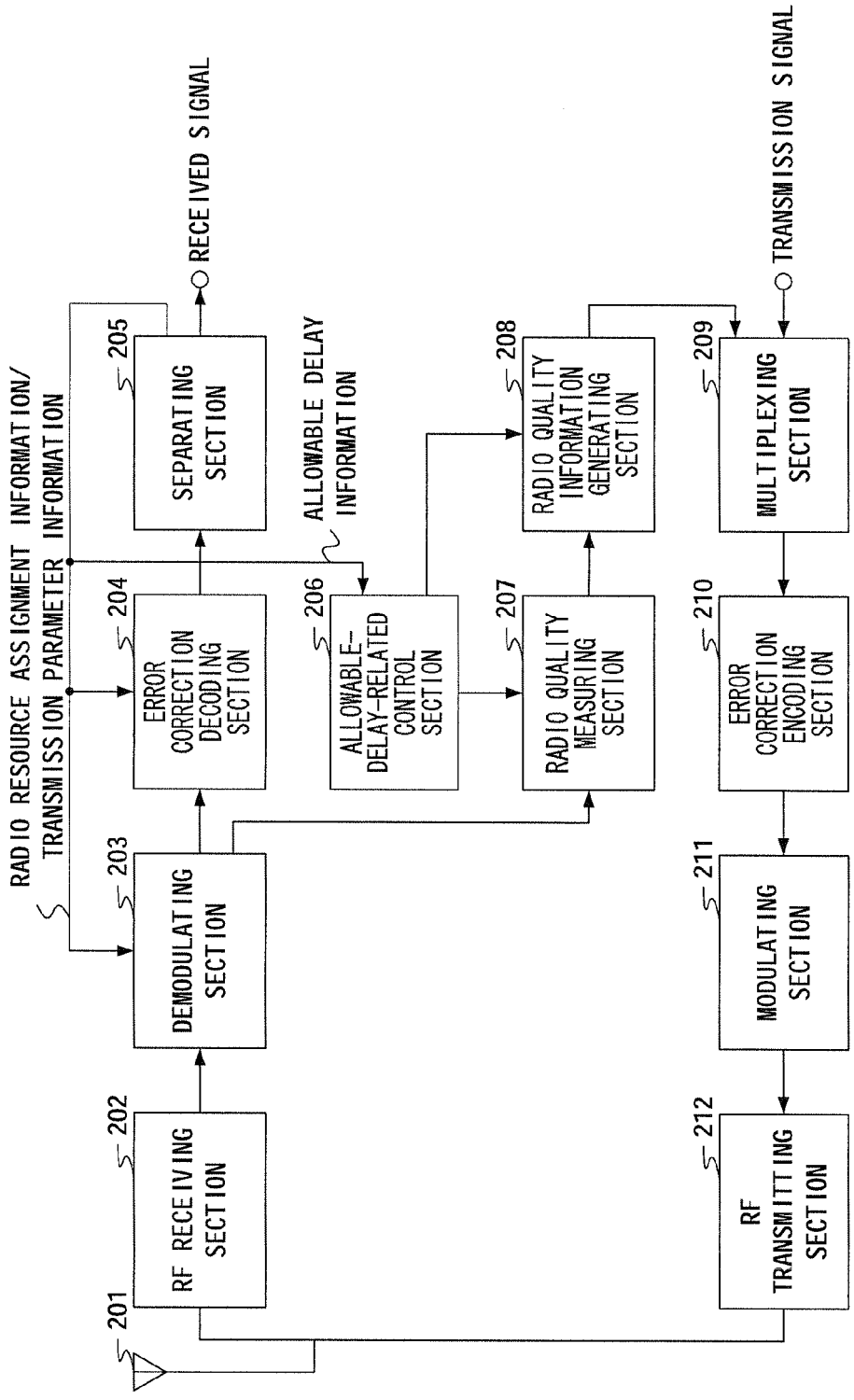
FIG. 2 is a block diagram showing a configuration of a communication terminal according to Embodiment 1 of the present invention.

FIG. 2 is a block diagram showing a configuration of the communication terminal according to Embodiment 1 of the present invention. Communication terminal 200 shown in FIG. 2 has antenna 201, RF receiving section 202, demodulating section 203, error correction decoding section 204, separating section 205, allowable-delay-related control section 206, radio quality measuring section 207, radio quality information generating section 208, multiplexing section 209, error correction encoding section 210, modulating section 211 and RF transmitting section 212.

Antenna 201 receives the signal transmitted from the base station apparatus, outputs the signal to RF receiving section 202, and transmits the transmission signal inputted from RF transmitting section 212.

RF receiving section 202 performs predetermined radio reception processing such as down-conversion on the signal received via antenna 201 and outputs the result to demodulating section 203.

Demodulating section 203 demodulates the signal inputted from RF receiving section 202 based on the resource assignment information and transmission parameter information inputted from separating section 205, and outputs the result to error correction decoding section 204.

Error correction decoding section 204 performs error correction decoding processing of the signal inputted from demodulating section 203 based on the resource assignment information and transmission parameter information inputted from separating section 205, and outputs the result to separating section 205.

Separating section 205 separates the demodulated signal inputted from error correction decoding section 204 into a received signal, allowable delay information for communication terminal 200, resource assignment information, and transmission parameter information. The allowable delay information thus separated is also outputted to allowable-delay-related control section 206. The resource assignment information and the transmission parameter information are outputted to demodulating section 203 and error correction decoding section 204.

Allowable-delay-related control section 206 instructs radio quality measuring section 207 to measure the channel quality, and instructs radio quality information generating section 208 to generate radio quality information based on the allowable delay information outputted from separating section 205. When communication terminal 200 is a terminal that performs communication having a large allowable delay, radio quality measuring section 207 and radio quality information generating section 208 are controlled so that the channel quality information is reported once every several report timings. The specific control method of allowable-delay-related control section 206 is described hereinafter.

Radio quality measuring section 207 measures channel quality based on the instruction of allowable-delay-related control section 206 and outputs the measured channel quality to radio quality information generating section 208.

Radio quality information generating section 208 generates channel quality information based on the channel quality outputted from radio quality measuring section 207 based on the instruction of allowable-delay-related control section 206, and outputs the channel quality information to multiplexing section 209.

Multiplexing section 209 multiplexes the transmission signal (transmission data) and the channel quality information outputted from radio quality information generating section 208, and outputs the result to error correction encoding section 210.

Error correction encoding section 210 performs error correction encoding of the output signal of multiplexing section 209, and outputs the result to modulating section 211.

Modulating section 211 modulates the signal inputted from error correction encoding section 210 and outputs the modulated signal to RF transmitting section 212.

RF transmitting section 212 performs predetermined radio reception processing such as up-conversion, and outputs the result to antenna 201.

Next, the method of reporting channel quality in the wireless communication system including base station apparatus 100 and communication terminal 200 configured as described above will be described.

Figure 3:
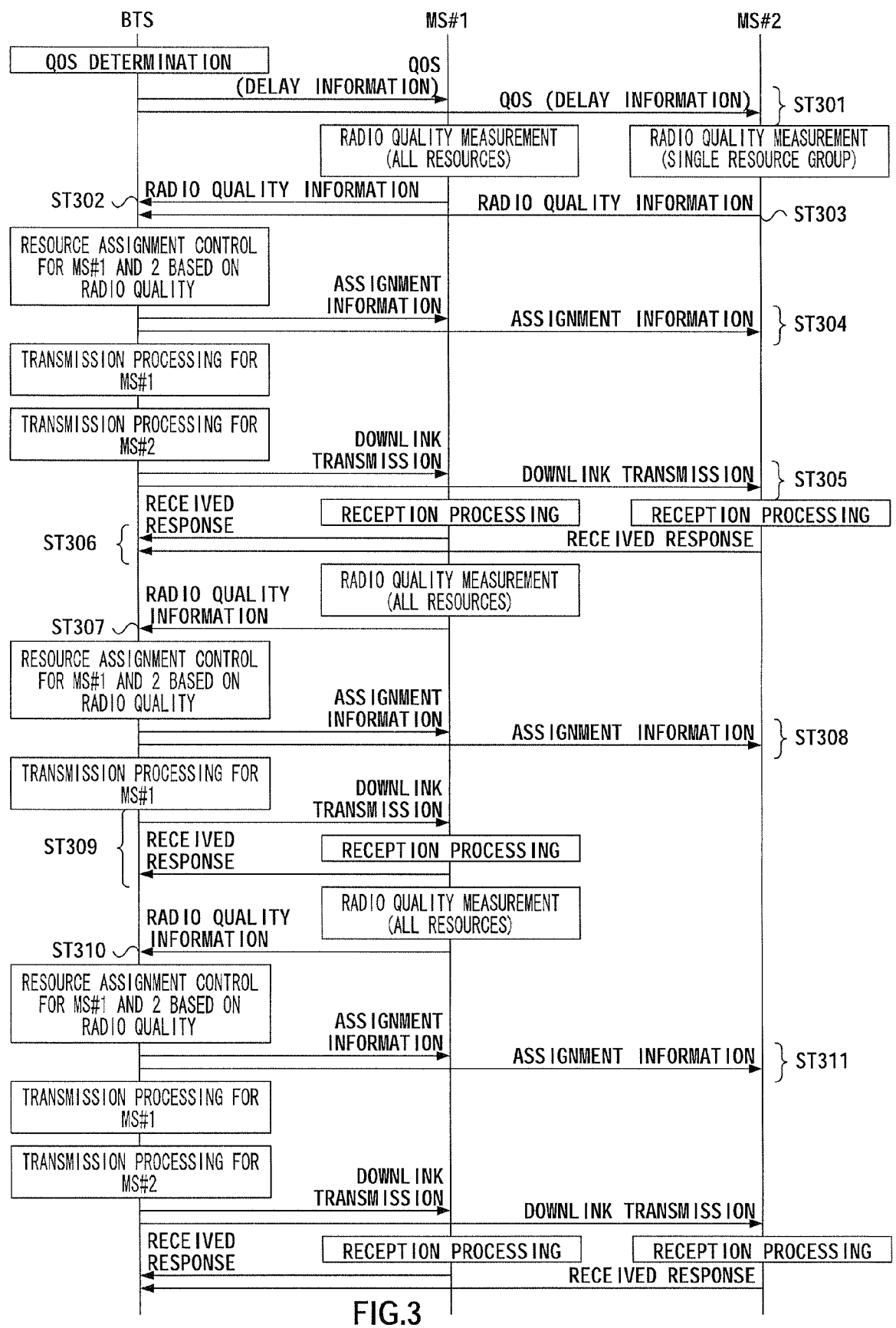
FIG. 3 is a sequence diagram showing a channel quality reporting method according to Embodiment 1 of the present invention.

FIG. 3 is a sequence diagram showing the channel quality information reporting method according to Embodiment 1.

Figure 4:
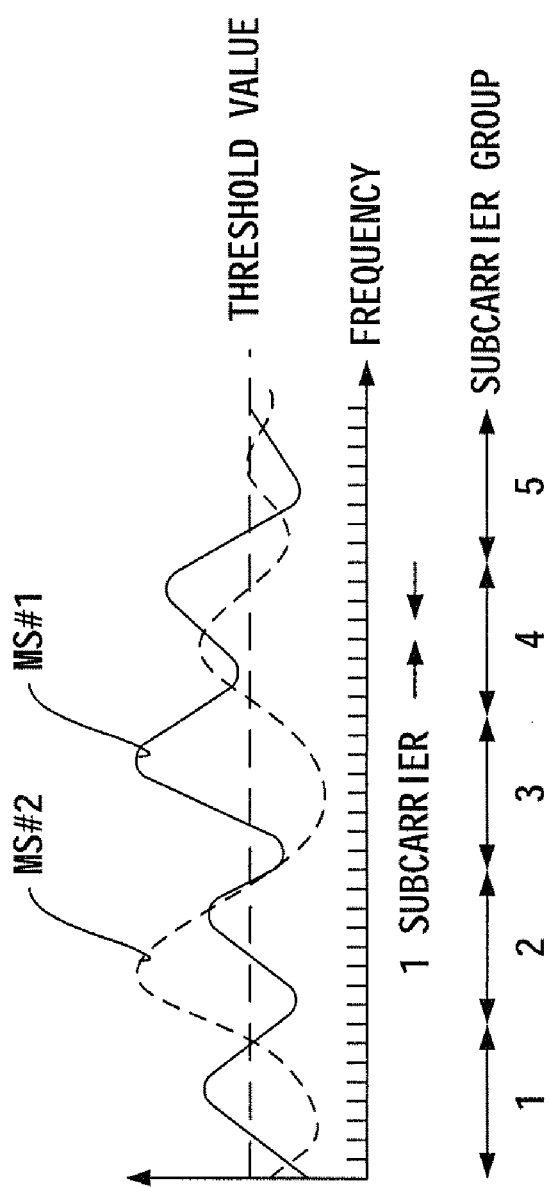
FIG. 4 is a concept diagram showing a configuration of a subcarrier group.

In this embodiment, the resource to be assigned is in subcarrier units, and each of several subcarriers constitutes a subcarrier group as shown in FIG. 4. The subcarrier groups are formed with the predetermined number of subcarriers herein, but this configuration is not limiting, and the base station apparatus and communication terminal can be determined arbitrarily or according to a condition such as a coherent bandwidth.

In FIG. 3, for the sake of convenient description, communication terminal MS#1 is a terminal that performs communication having a small allowable delay, and communication terminal MS#2 is a terminal that performs communication having a large allowable delay.

Base station apparatus 100 determines the QoS (Quality of Service) for each communication terminal. At this time, base station apparatus 100 transmits QoS information including a required quality (allowable delay information) relating to the allowable delay, generated by allowable delay information generating sections 106-1 and 106-2 (step ST301).

Communication terminal MS#1 and communication terminal MS#2 determine whether or not communication terminal MS#1 and communication terminal MS#2 are terminals that perform communication having a small allowable delay. The determination is made based on the allowable delay information transmitted from base station apparatus 100. This determination is made by allowable-delay-related control section 206.

When the terminal is one that performs communication having a small allowable delay (MS#1), allowable-delay-related control section 206 instructs radio quality measuring section 207 to measure the quality of all subcarriers, and instructs radio quality information generating section 208 to generate quality information for all subcarriers. Radio quality measuring section 207 measures the channel quality of all subcarriers based on the instruction of allowable-delay-related control section 206, and outputs the result to radio quality information generating section 208. Radio quality information generating section 208 generates radio quality information for all subcarriers according to the instruction of allowable-delay-related control section 206. The radio quality information thus generated is transmitted to base station apparatus 100 (step ST302).

When the terminal performs communication having a large allowable delay (MS#2), allowable-delay-related control section 206 instructs radio quality measuring section 207 to measure the channel quality of all subcarriers and to calculate the average quality of each subcarrier group from the measured values. One average quality information is thereby transmitted for the subcarrier group in the terminal that performs communication having a large allowable delay, so that it is possible to reduce the amount of transmitted information. Furthermore, in the case of this embodiment, an instruction is issued so that the channel quality information (that is, channel quality is not averaged by radio quality measuring section 207 for the subcarrier group) of all subcarriers in the subcarrier group that has a good average quality, and the group number of the subcarrier group are outputted to radio quality information generating section 208. An adequate amount of information can thereby be assured for a subcarrier group that requires detailed channel quality information, while reducing the overall amount of transmitted information. Base station apparatus 100 is also reported that no reporting is performed at the second and third report timings (step ST303).

In the case shown in FIG. 4, communication terminal MS#1 reports the channel quality of all subcarriers to base station apparatus 100. However, since subcarrier group 2 has the best average channel quality, communication terminal MS#2 reports the channel quality of all subcarriers in subcarrier group 2 and that the subcarrier group is subcarrier group 2 to base station apparatus 100.

All subcarriers are also measured in the terminal that performs communication having a large allowable delay in this example, but this configuration is not limiting, and there is no need to separately measure the channel quality of all subcarriers when the average quality of the subcarrier group can be measured. The channel quality is also reported in resource group units such as subcarrier groups in this example, but a configuration may also be adopted in which any resource that has good channel quality is reported.

In base station apparatus 100, resources used by communication terminal MS#1 and communication terminal MS#2 are assigned by resource assigning section 107 based on the channel quality information transmitted from communication terminal MS#1 and communication terminal MS#2, and the assignment information is reported to communication terminal MS#1 and communication terminal MS#2 (step ST304).

Base station apparatus 100 performs transmission processing to communication terminals based on the determined resource assignment (step ST305), and returns a reception response to base station apparatus 100 after reception processing is completed in the communication terminals (step ST306).

At the second report timing, only communication terminal MS#1 that performs communication having a small allowable delay reports the channel quality information for all subcarriers (step ST307). Since communication terminal MS#2 that performs communication having a large allowable delay has been reported that no report will be made at the second and third report timings, communication terminal MS#2 does not perform measurement and reporting upon the channel quality information reporting in step ST303. By this means, the channel quality of communication terminal MS#2 having the large allowable delay is thereby reported less often, and therefore the current consumption and the interference caused by transmission of channel quality information are reduced correspondingly.

The base station apparatus assigns resources based on the channel quality information from communication terminal MS#1 at the second report timing, and the channel quality information of communication terminal MS#2 at the first report timing, and transmits the resource assignment information to the communication terminals (step ST308).

After transmission between the base station apparatus and the communication terminals (step ST309) is completed, in accordance with the resource assignment information (it is assumed herein that resources are assigned only to communication terminal MS#1), communication terminal MS#1 also reports the channel quality information at the third report timing (step ST310), and communication terminal MS#2 does not report the channel quality information, as with at the second report timing.

The base station apparatus performs resource assignment based on the channel quality information from communication terminal MS#1 at the third report timing, and the channel quality information from communication terminal MS#2 at the first report timing, and transmits the resource assignment information to the communication terminals (step ST311).

The fourth report timing and later report timings are not shown, but the process may return to the beginning of the control sequence, or a configuration may be adopted in which only communication terminal MS#1 makes a report, as at the second and third report timings, and communication terminal MS#2 makes a report after a fixed number of report timings.

According to this embodiment thus configured, the reporting frequency and the amount of the channel quality information used in resource assignment is changed based on the size (allowable delay information) of the allowable delay, and thereby the channel quality information is not reduced for a terminal that performs communication having a small allowable delay. Therefore, the probability of a resource being assigned is equal to that of the conventional method, and the probability for transmitting within the allowable delay time can be maintained at the same level as in the conventional method, so that it is possible to reduce the reporting frequency and amount of information reported to a terminal that performs communication having a large allowable delay, and thereby reduce uplink interference and the current consumption of the communication terminal.

In this embodiment, a case has been described where the reporting frequency of the channel quality information is changed based on the allowable delay information, and the amount of channel quality information is changed by transmitting only the average value for the subcarrier group based on the allowable value information. However, it is also possible to adopt a configuration where only the reporting frequency is changed, or only the amount of information is changed.

In this Embodiment, the configuration has been adopted where a terminal that performs communication having a large allowable delay reports channel quality information at a ratio of once with respect to a predetermined report timings, but this configuration is not limiting, and it is also possible to adaptively change the reporting frequency based on the maximum Doppler frequency, as described hereinafter.

Figure 5:
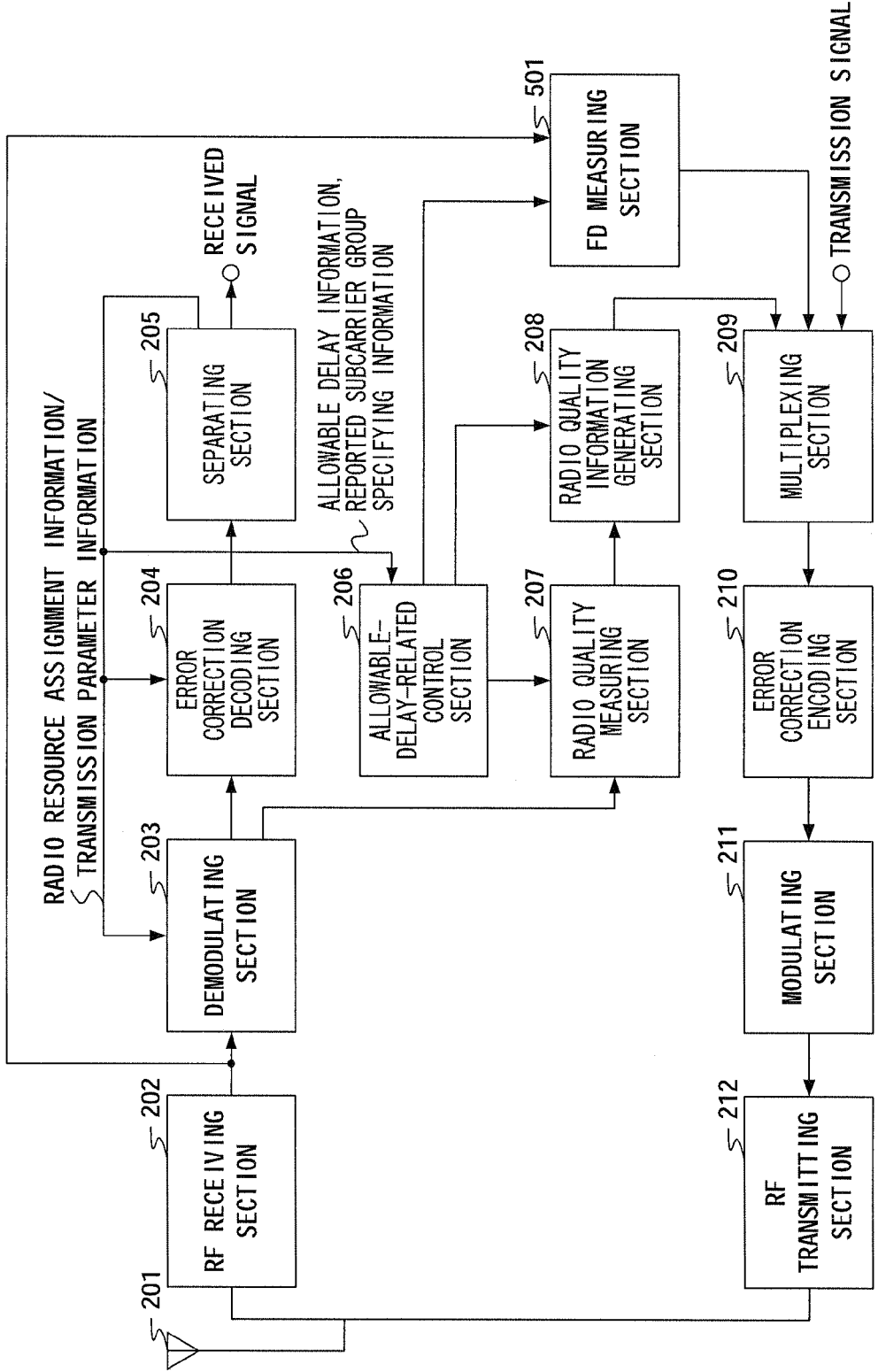
FIG. 5 is a block diagram showing another configuration of the communication terminal according to Embodiment 1 of the present invention.

FIG. 5 is a block diagram showing another configuration of the communication terminal according to Embodiment 1 of the present invention. Communication terminal 500 is configured with Doppler frequency (fD) measuring section 501 in addition to communication terminal 200 shown in FIG. 2. In FIG. 5, components that are the same as those in FIG. 2 will be assigned the same reference numerals without further explanations.

Allowable-delay-related control section 206 instructs Doppler frequency measuring section 501 to measure the maximum Doppler frequency when it is determined that the communication terminal is a terminal that performs communication having a large allowable delay.

Doppler frequency measuring section 501 measures a Doppler frequency based on the output signal of RF receiving section 202 and outputs maximum Doppler frequency information to multiplexing section 209. The maximum Doppler frequency information outputted to multiplexing section 209 is multiplexed with the channel quality information and the transmission signal, and the result is transmitted to the base station apparatus.

Figure 6:
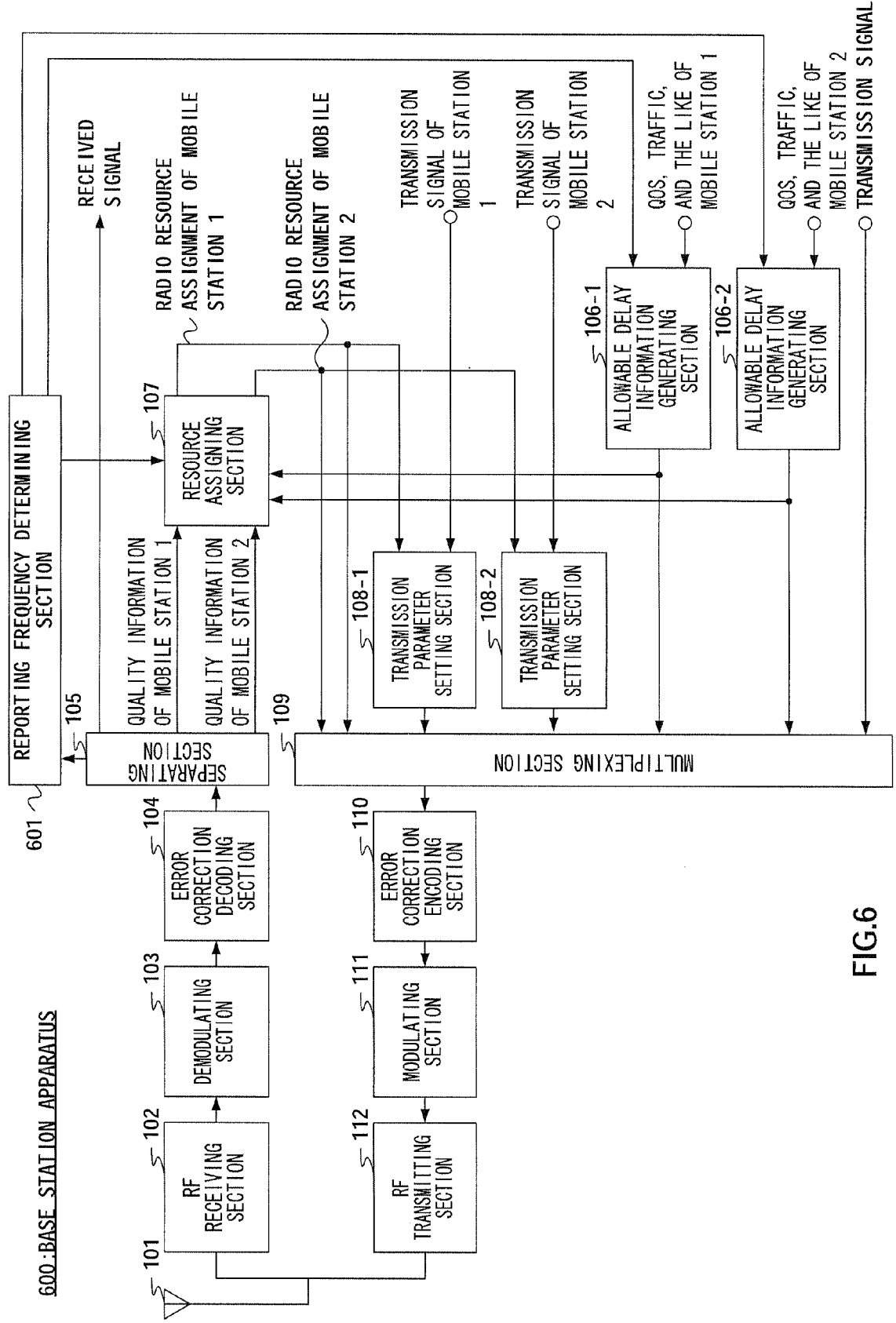
FIG. 6 is a block diagram showing another configuration of the base station apparatus according to Embodiment 1 of the present invention.

FIG. 6 is a block diagram showing another configuration of the base station apparatus according to Embodiment 1 of the present invention. Base station apparatus 600 is configured with reporting frequency determining section 601 in addition to base station apparatus 100 shown in FIG. 1. In FIG. 6, components that are the same as those in FIG. 1 will be assigned the same reference numerals without further explanations.

Separating section 105 separates maximum Doppler frequency information from the signal inputted from the error correction decoding section, and outputs the maximum Doppler frequency information to reporting frequency determining section 601.

Reporting frequency determining section 601 sets the reporting frequency of the channel quality information in the terminal that performs communication having a large allowable delay, based on the maximum Doppler frequency information. Specifically, the reporting frequency is increased when the maximum Doppler frequency is high, and the reporting frequency is decreased when the maximum Doppler frequency is low. The reporting frequency information thus set is outputted to resource assigning section 107 and allowable delay information generating sections 106-1 and 106-2.

Allowable delay information generating sections 106-1 and 106-2 generate allowable delay information based on the reporting frequency information determined by reporting frequency determining section 601, and output the allowable delay information to multiplexing section 109. At communication terminal 500, the channel quality is reported in accordance with the reporting frequency indicated by base station apparatus 600.

Resource assigning section 107 can learn from the reporting frequency information outputted from reporting frequency determining section 601, the timing at which the terminal that performs communication having a large allowable delay reports the channel quality information, and assigns resources based on the most recently reported channel quality information until the report timing comes.

In this way, by adaptively changing the reporting frequency of the channel quality information used for resource assignment, it is possible to perform reporting when the reliability of the reported channel quality information begins to decrease. The frequency with which the channel quality information is reported can be reduced particularly when the maximum Doppler frequency is low, and the reliability of the reported channel quality information can be maintained for a relatively long time.

A configuration may also be adopted where the reporting frequency is set by the communication terminal itself based on the allowable delay information from the base station and the measured Doppler frequency, and not by the base station, and the channel quality or the resource group is reported to the base station along with the reporting frequency upon reporting.

Embodiment 2

Figure 7:
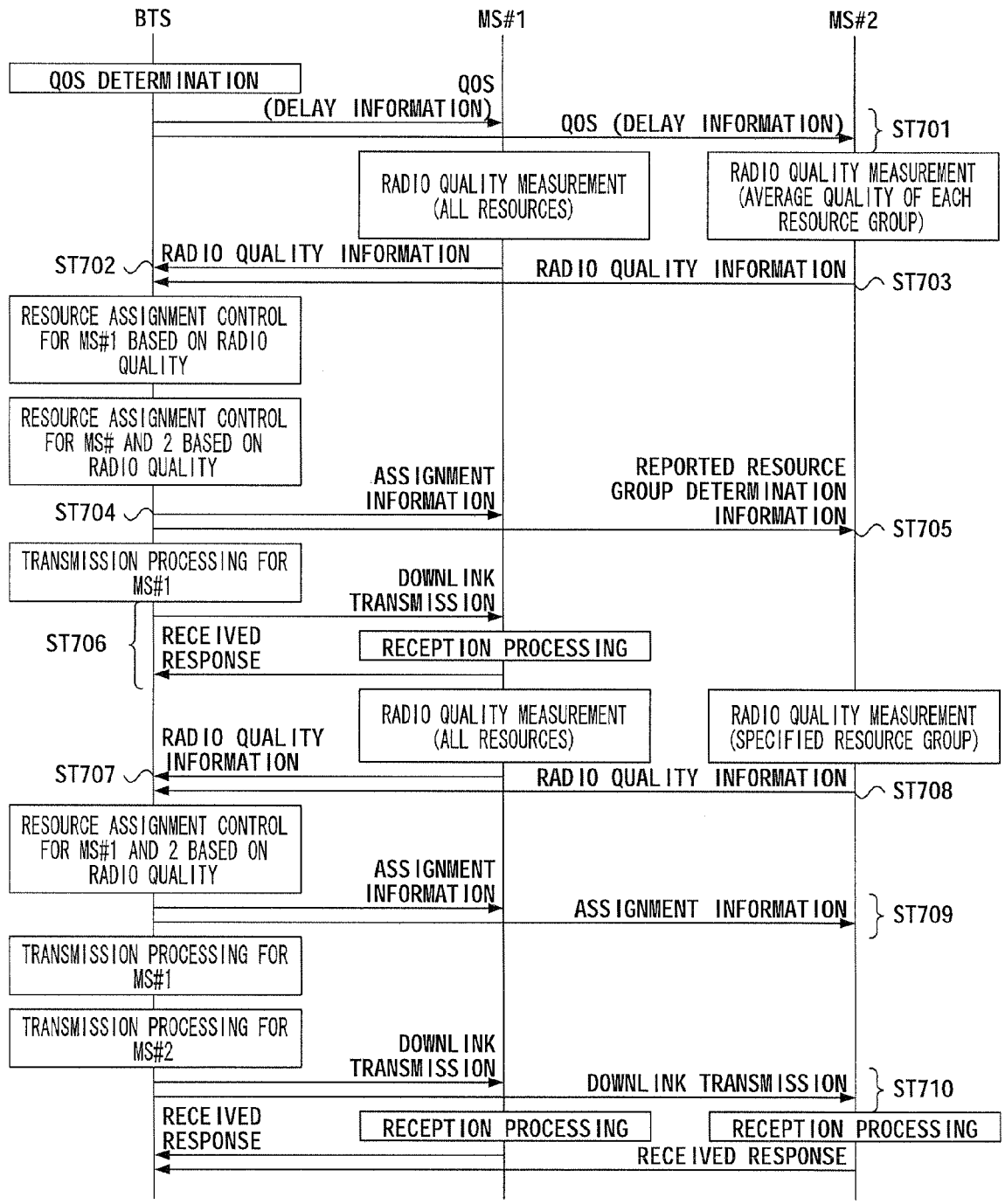
FIG. 7 is a sequence diagram showing the channel quality reporting method according to Embodiment 2 of the present invention.

FIG. 7 is a sequence diagram showing the channel quality reporting method according to Embodiment 2. The base station apparatus and communication terminal have the same configuration as in Embodiment 1, and will not be described.

In this Embodiment, as in Embodiment 1, the resource to be assigned is in subcarrier units, and the several subcarriers constitute a subcarrier group as shown in FIG. 4.

In FIG. 7, for the sake of convenient description, communication terminal MS#1 is a terminal that performs communication having a small allowable delay, and communication terminal MS#2 is a terminal that performs communication having a large allowable delay.

The base station apparatus determines the QoS of each communication terminal and transmits QoS information that includes a required quality (allowable delay information) relating to the allowable delay (step ST701).

Communication terminal MS#1 and communication terminal MS#2 determine whether or not communication terminal MS#1 and communication terminal MS#2 are terminals for which a delay is allowable, based on the allowable delay information.

When the terminal performs communication having a small allowable delay (MS#1), allowable-delay-related control section 206 instructs radio quality measuring section 207 to measure the quality of all subcarriers, and instructs radio quality information generating section 208 to generate quality information for all subcarriers. Radio quality measuring section 207 measures the channel quality of all subcarriers based on the instruction of allowable-delay-related control section 206, and outputs the result to radio quality information generating section 208. Radio quality information generating section 208 generates radio quality information for all subcarriers according to the instruction of allowable-delay-related control section 206. The radio quality information thus generated is transmitted to base station apparatus 100 (step ST702).

When the terminal performs communication having a large allowable delay (MS#2), allowable-delay-related control section 206 instructs radio quality measuring section 207 to measure the channel quality of all subcarriers and calculate the average quality for each subcarrier group from the measured values. Allowable-delay-related control section 206 also issues an instruction to report the average quality for each subcarrier group thus calculated. The channel quality information thus generated is transmitted to the base station apparatus (step ST703).

In base station apparatus 100, resources are assigned based on the channel quality information reported from communication terminal MS#1, and the assignment information is reported to communication terminal MS#1 (step ST704). On the other hand, the reported subcarrier group specifying information that indicates an instruction to report only a subcarrier group having a good average quality is transmitted to communication terminal MS#2 based on the average quality of each subcarrier group reported from communication terminal MS#2 (step ST705).

Communication terminal MS#1 whose allowable delay is small transmits (step ST707) the channel quality information relating to all subcarriers at the second report timing in the same way as the first report, based on the determined resource assignment after reception processing is completed (step ST706) with regard to communication terminal MS#1.

On the other hand, communication terminal MS#2 that performs communication having a large allowable delay measures the channel quality of all subcarriers in the subcarrier group only for the subcarrier group that is specified by the reported subcarrier group specifying information, and reports the channel quality to base station apparatus 600. For the next and subsequent report timings, it is reported that the channel quality will not be reported for a predetermined number of times (step ST708).

Base station apparatus 600 performs resource assignment based on the channel quality information transmitted from communication terminal MS#1 and communication terminal MS#2, and transmits the resource assignment information to each communication terminal (step ST709).

After transmission and reception processing to/from the communication terminals is completed (step ST710), communication terminal MS#1 reports the channel quality information for all subcarriers at the third report timing in the same way as at the first and second report timings. Communication terminal MS#2 does not perform reporting for a predetermined number of times (number reported in step ST708), and returns to the average quality reporting for each subcarrier group in the same way as the first report after the reported number of times.

According to this embodiment thus configured, for the terminal that performs communication having a large allowable delay, by first selecting the average quality of all resource groups, selecting a resource group having a good average quality at the base station apparatus, and reporting the channel quality of all subcarriers in the selected resource group, it is possible to reduce the amount of information reported in the second (second report timing) and subsequent stages from a user whose allowable delay is large and perform good resource assignment based on the reported values with the second stage.

In this embodiment, in a terminal that performs communication in which a delay is allowable, the average channel quality for each resource group is reported in the first stage, and the channel quality of all subcarriers in a specified resource group is reported in the second stage, but this configuration is not limiting. In short, in a terminal that performs communication in which a delay is allowable, a configuration may be adopted in which the general channel quality for each resource group is reported in the first stage, and the more specific channel quality in the specified resource group is reported in the second stage. It is thereby possible to increase only the amount of channel information in subcarriers for which detailed channel quality information is desired, in the same way as in the embodiment, so that it is possible to reduce the reported channel quality information and perform good resource assignment. It is also effective to determine the reporting frequency of the channel quality information for each subsequent resource group based on the general channel quality information for each resource group transmitted in the first stage.

In this embodiment, the base station apparatus selects the reported subcarrier group based on the average quality of the subcarrier groups reported to a terminal that performs communication having a large allowable delay, but this configuration is not limiting, and the reported subcarrier group may be determined after excluding a resource that is assigned to a user having a small allowable delay.

By determining the resource to be reported after excluding resources assigned to a user having a small allowable delay, a resource that is preferentially/exclusively assigned to a user having a small allowable delay can be excluded from reporting, so that a user whose allowable delay is large can report the channel quality for only a resource that will be assigned. By this means, when a case is considered where the amount of reported information accumulates on the time axis, it is possible to obtain an effect of further reduction.

The base station apparatus may also exclude from assignment a resource group having poor channel quality common to channel quality information reported from communication terminals, and may select a resource group for which channel quality is reported from other resource groups. The current consumption or interference that accompanies measurement or reporting of channel quality can thus be reduced by excluding from assignment a resource group having poor channel quality common to the communication terminals.

The reporting frequency may also be adaptively changed according to the Doppler frequency in the same way as in Embodiment 1.

In both Embodiments 1 and 2, a case has been described where a single communication terminal performs single communication, but the present invention is not limited by this configuration and is also applicable when a single communication terminal performs a plurality of communications. In this case, the reporting processing described above may be performed according to the strictest allowable delay among the delay conditions in each communication. For example, when communication having a small allowable delay and communication having a large allowable delay are performed simultaneously, a report may be made for all resources every time in accordance with the communication having a small allowable delay, and in the case of performing only communication having a large allowable delay, reporting may be performed less often.

The present application is based on Japanese Patent Application No. 2004-321253, filed on Nov. 4, 2004, the entire content of which is expressly incorporated by reference herein.

INDUSTRIAL APPLICABILITY

The channel quality reporting method, the base station apparatus, and the communication terminal according to the present invention are capable of reducing the current consumption and suppressing interference with uplink traffic that accompany generation or reporting of channel quality information, and can be widely applied to wireless communication systems in which a base station apparatus reports channel quality information which is a reference for determining resource assignment.

The invention claimed is:

1. A method for reporting channel quality information transmitted from a communication terminal, the channel quality information being used as a reference when a base station apparatus determines resource assignment, the method comprising:
at the communication terminal:
receiving allowable delay information comprising a size of an allowable delay for user data of the communication terminal and which is transmitted from the base station apparatus;
generating the channel quality information based on the allowable delay information;
reporting the channel quality information to the base station apparatus; and
during a communication in which a delay is allowable, reducing an amount of the channel quality information reported to the base station apparatus based on the allowable delay information, compared to an amount of the channel quality information reported during a communication in which the delay is not allowable,
wherein the method further comprises, during the communication in which the delay is not allowable, reporting the channel quality information for each resource of all resources, and, during the communication in which the delay is allowable, reporting the channel quality information for each of a plurality of resource groups dividing all the resources.

2. The channel quality information reporting method according to claim 1, further comprising during the communication in which the delay is allowable, reducing a reporting frequency of the channel quality information reported to the base station apparatus based on the allowable delay information, compared to a reporting frequency of the channel quality information reported during the communication in which the delay is not allowable.

3. The channel quality information reporting method according to claim 2, further comprising changing the reporting frequency of the channel quality information based on the allowable delay information as well as a maximum Doppler frequency of the communication terminal.

4. The channel quality information reporting method according to claim 1, further comprising excluding a resource group having a poor channel quality common to a plurality of communication terminals from the channel quality information of each resource group reported from a communication terminal that performs the communication in which the delay is allowable, and then specifying, at the base station apparatus, a resource group in which the channel quality information of each resource is to be reported by the communication terminal that performs the communication in which the delay is allowable.

5. The channel quality information reporting method according to claim 1, further comprising during the communication in which the delay is allowable, reporting the channel quality information for each of the plurality of resource groups, and reporting the channel quality information for each resource in one of the plurality of resource groups specified by the base station apparatus.

6. The channel quality information reporting method according to claim 5, further comprising excluding a resource assigned to a first communication terminal that performs the communication in which the delay is not allowable, and then specifying, at the base station apparatus, the resource group in which the channel quality information of each resource is to be reported by a second communication terminal that performs the communication in which the delay is allowable.

7. The channel quality information reporting method according to claim 5, further comprising excluding a resource group having a poor channel quality common to a plurality of communication terminals from the channel quality information of each resource group reported from a communication terminal that performs the communication in which the delay is allowable, and then specifying, at the base station apparatus, the resource group in which the channel quality information of each resource is to be reported by the communication terminal that performs the communication in which the delay is allowable.

8. A communication terminal comprising:
- a receiving section that receives allowable delay information indicating a size of an allowable delay of the communication terminal;
- a channel quality information generating section that generates channel quality information which is used as a reference when a base station apparatus assigns a resource based on the allowable delay information; and
- a channel quality information reporting section that reports the generated channel quality information, wherein, during a communication in which a delay is allowable, the channel quality information generating section reduces an amount of the channel quality information reported to the base station apparatus, based on the allowable delay information, compared to an amount of the channel quality information reported during a communication in which the delay is not allowable,
- wherein the channel quality information generating section generates the channel quality information for each resource of all resources during the communication in which the delay is not allowable, and generates the channel quality information for each of a plurality of resource groups dividing all the resources during the communication in which the delay is allowable.

9. The communication terminal according to claim 8, wherein, during the communication in which the delay is allowable, the channel quality reporting section reduces a reporting frequency of the channel quality information reported to the base station apparatus, compared to a reporting frequency of the channel quality information reported during the communication in which the delay is not allowable.

10. The communication terminal according to claim 9, wherein the channel quality reporting section changes the reporting frequency of the channel quality information based on the allowable delay information as well as a maximum Doppler frequency of the communication terminal.

11. A base station apparatus comprising:
- a receiving section that receives channel quality information which is transmitted from a communication terminal and used as a reference for determining resource assignment;
- a resource assigning section that performs the resource assignment based on the channel quality information;
- a transmitting section that transmits data to the communication terminal based on the resource assignment; and
- an instructing section that issues an instruction about an amount of the channel quality information, which is to be reported, to the communication terminal, based on a size of an allowable delay of the communication terminal,
- wherein the instructing section instructs a first communication terminal that performs a communication in which a delay is allowable to reduce an amount of the channel quality information to be transmitted based on the size of the allowable delay, compared to an amount of the channel quality information to be transmitted by a second communication terminal that performs a communication in which the delay is not allowable, and
- the instructing section instructs the second communication terminal that performs the communication in which the delay is not allowable, to report the channel quality information for each resource of all resources, and instructs the first communication terminal that performs the communication in which the delay is allowable, to report the channel quality information for each of a plurality of resource groups dividing all the resources.

12. The base station apparatus according to claim 11, wherein the resource assigning section performs resource assignment based on the channel quality information transmitted at each predetermined report timing from the second communication terminal, and latest channel quality information transmitted from the first communication terminal, until transmission of new channel quality information from the first communication terminal.

13. The base station apparatus according to claim 11, further comprising a specifying section that specifies one of a plurality of the resource groups in which the channel quality information of each resource is to be reported,
- wherein the instructing section instructs the first communication terminal that performs the communication in which the delay is allowable, to report the channel quality information of each resource in the specified resource group.

14. The base station apparatus according to claim 13, wherein the specifying section further specifies the resource group in which the channel quality information of each resource is to be reported by the first communication terminal that performs the communication in which the delay is allowable, after excluding a resource assigned to the second communication terminal that performs the communication in which the delay is not allowable.

15. The base station apparatus according to claim 13, wherein the specifying section specifies the resource group in which the channel quality information of each resource is to be reported by the first communication terminal that performs the communication in which the delay is allowable, after excluding a resource group having a poor channel quality common to a plurality of communication terminals from the channel quality information of each resource group reported from the first communication terminal that performs the communication in which the delay is allowable.

16. The base station apparatus according to claim 11, wherein the instructing section further instructs the first communication terminal that performs the communication in which the delay is allowable, to reduce a reporting frequency of the channel quality information, compared to a reporting frequency of the second communication terminal that performs the communication in which the delay is not allowable.

* * * * *